United States Patent [19]

Monneret

[11] Patent Number: 5,580,072
[45] Date of Patent: Dec. 3, 1996

[54] VEHICLE OF THE BUGGY TYPE

[75] Inventor: Alain Monneret, Voiteur, France

[73] Assignee: Monneret Jouets, Lons-Le-Saunier, France

[21] Appl. No.: 259,010

[22] Filed: Jun. 13, 1994

[30] Foreign Application Priority Data

Jun. 15, 1993 [FR] France ..................... 93 07437

[51] Int. Cl.$^6$ .................. B62B 7/14; B62B 9/14
[52] U.S. Cl. .............. 280/47.38; 280/644; 280/647; 296/97.21; 297/184.17
[58] Field of Search ................ 280/47.38, 642, 280/644, 647, 650, 643, 648, 30; 296/97.21; 297/184.11, 184.13, 184.17

[56] References Cited

U.S. PATENT DOCUMENTS

| 2,055,890 | 9/1936 | Berry | 296/97.21 X |
| 2,476,160 | 7/1949 | Shott | 296/97.21 |
| 3,402,939 | 9/1968 | De Falco | 296/97.21 X |

FOREIGN PATENT DOCUMENTS

| 1008029 | 5/1952 | France . | |
| 2295864 | 7/1976 | France | 296/97.21 |
| 239897 | 10/1911 | Germany | 280/47.38 |
| 1580193 | 7/1970 | Germany . | |
| 328647 | 3/1976 | Germany . | |
| 0291517 | 7/1991 | Germany | 280/47.38 |

Primary Examiner—Brian L. Johnson
Attorney, Agent, or Firm—Oliff & Berridge

[57] ABSTRACT

A vehicle for carrying an object or an individual includes an underframe with a rolling device, and a carriage supported by the underframe. The carriage is made up of at least one reinforcement and a flexible covering matched to the developed surface of the reinforcement, covering and fixed to the reinforcement. The reinforcement includes a central framework generally having the shape of a trough, made up of two flanks on either side of a base, a flat bottom, the middle part of which is adapted to be gripped between the two flanks of the central framework, which rests flat on a base, and a hoop. The hoop is matched to the contour of the flat bottom and two middle parts that are separated from one another by a distance that is compatible with the separation of the two flanks of the central framework.

15 Claims, 3 Drawing Sheets

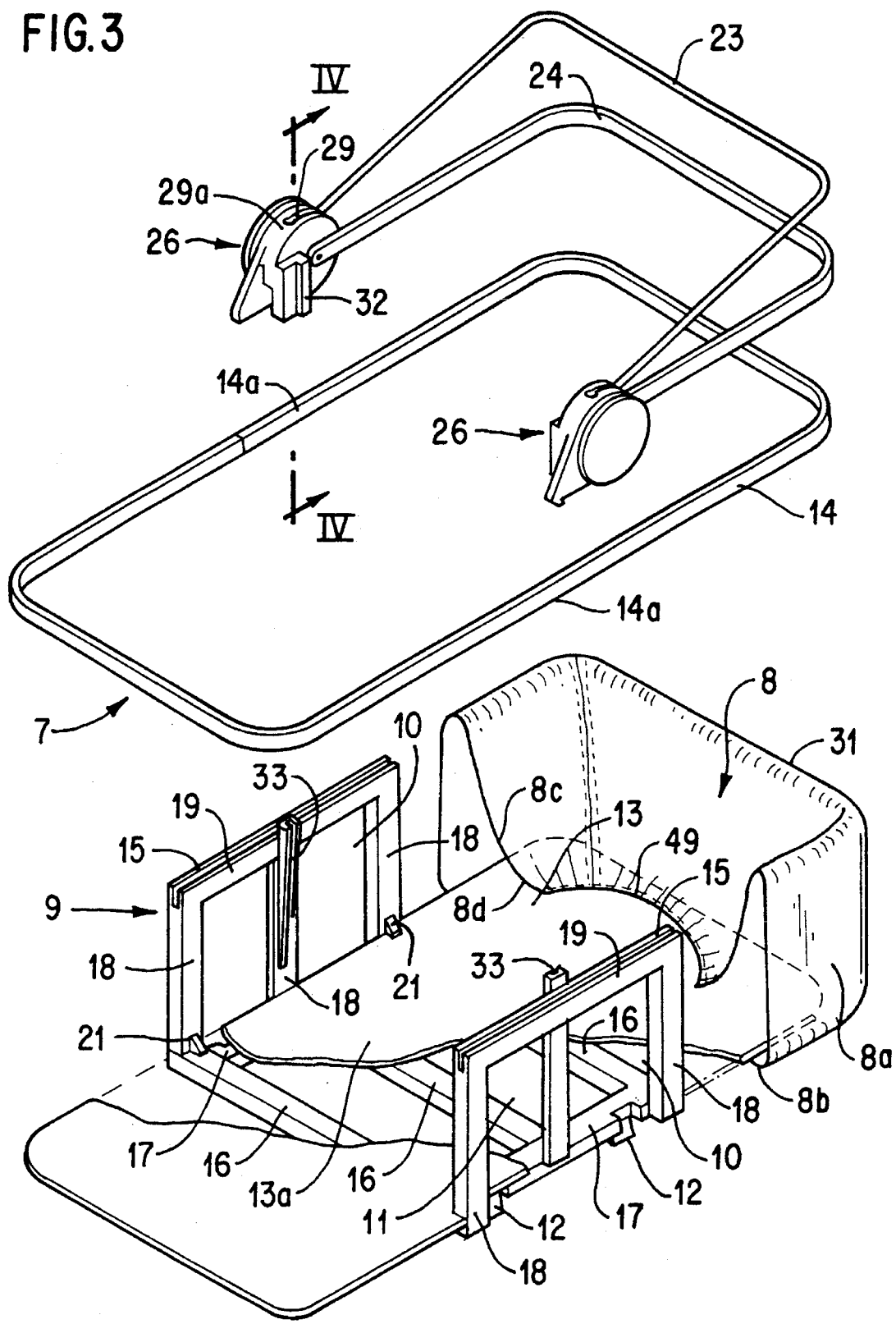

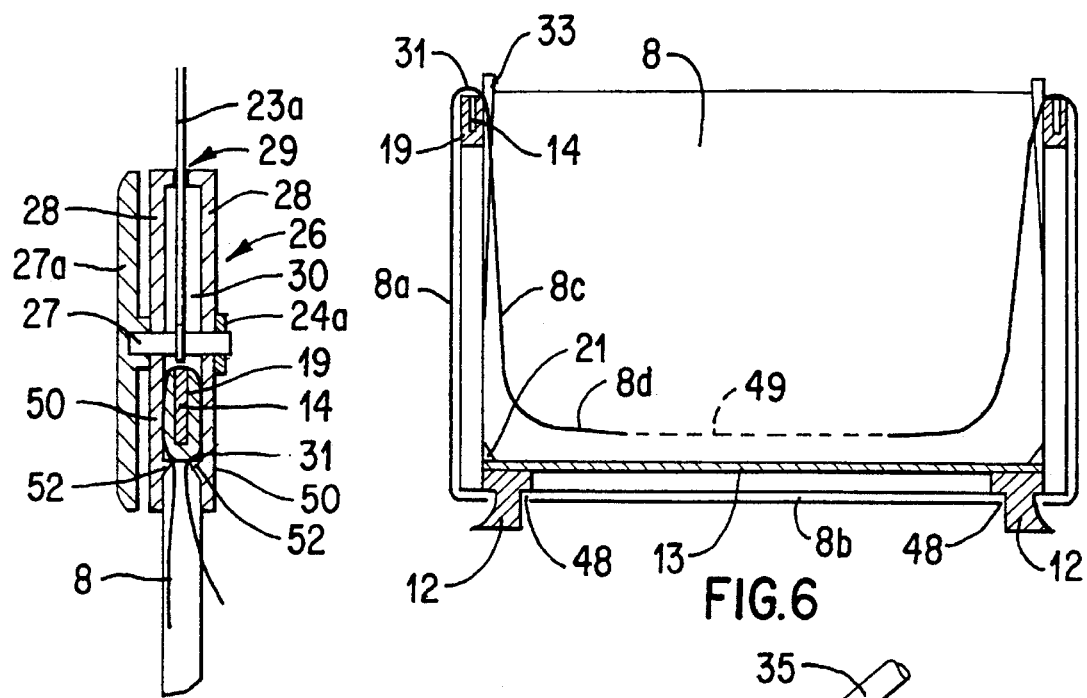
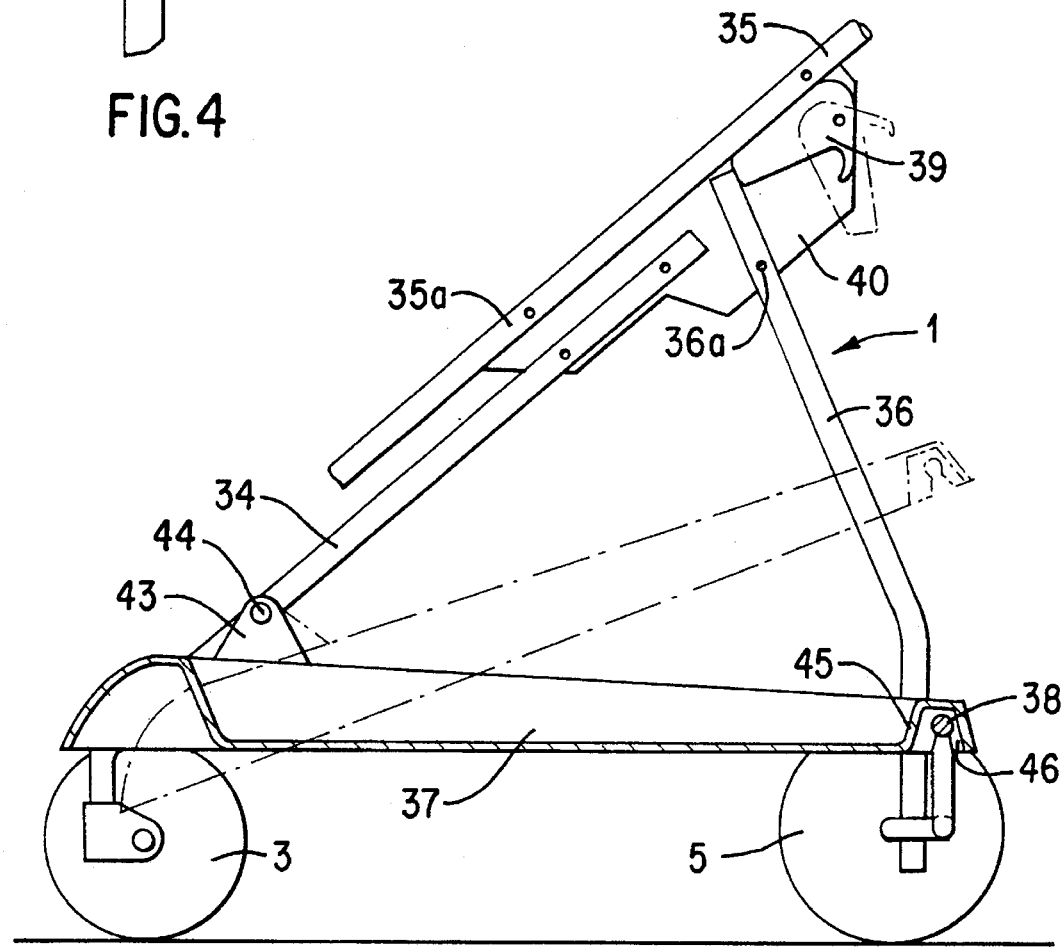

VEHICLE OF THE BUGGY TYPE

BACKGROUND OF THE INVENTION

The present invention relates generally to a vehicle for carrying or transporting an object or an individual, comprising an underframe with a rolling device and a carriage supported by the underframe, the carriage being intended to receive the object or the individual. The present invention will be described by reference to a toy buggy, intended to receive a child's doll, but it is emphasized that the provisions or technical characteristics described hereinbelow may be exploited for a real buggy for a child.

In general, the invention relates to a buggy, the carriage of which is made up of at least one reinforcement determining a tray for receiving the object or the individual, the tray itself being supported by the underframe, as well as of a supply covering, matched to the developed surface of the reinforcement, such as a piece of fabric, covering over and fixed to the reinforcement.

The subject of the invention is a reinforcement making it possible to obtain all sorts of carriages, both in terms of shapes and in terms of dimensions, using a standard main component and two components that are specific to each of the shapes or dimensions of the various models.

SUMMARY OF THE INVENTION

According to the present invention, the reinforcement comprises at least three components, intended to interact with one another in order to make up the carriage, namely:
- a central framework generally having the shape of a trough, made up of two flanks projecting on either side of a base equipped with a device for fixing the framework to the underframe,
- a flat bottom, the central part of which is matched, in terms of shape and dimensions, in order to be gripped between the flanks of the central framework, resting flat on its base,
- a hoop, the shape of which is matched to the contour of the flat bottom, and of which at least the two central parts of its longitudinal sides are separated from one another by a distance which is compatible with the separation of the two flanks of the central framework,
- and a device for fixing the central parts of the hoop at or on the upper part of the two flanks of the central framework.

By virtue of the invention, by providing various sets of flat bottoms and hoops, it is possible, starting from the same central framework, to obtain models of carriages which can be distinguished from one another by their length or overall shape.

BRIEF DESCRIPTION OF THE DRAWINGS

The present invention is now described with reference to the appended drawing, in which:

FIG. 3 is a perspective view of the reinforcement of the carriage and of the hoops of the hood, FIG. 4 represents a vertical section on IV—IV of FIG. 3, of a component by means of which the hood is articulated, FIG. 5 is a side view with partial section representing the underframe of the buggy in the assembled and service position, FIG. 6 is a section on VI—VI of FIG. 1 of the assembled carriage.

DETAILED DESCRIPTION OF PREFERRED EMBODIMENTS

Figure 1:
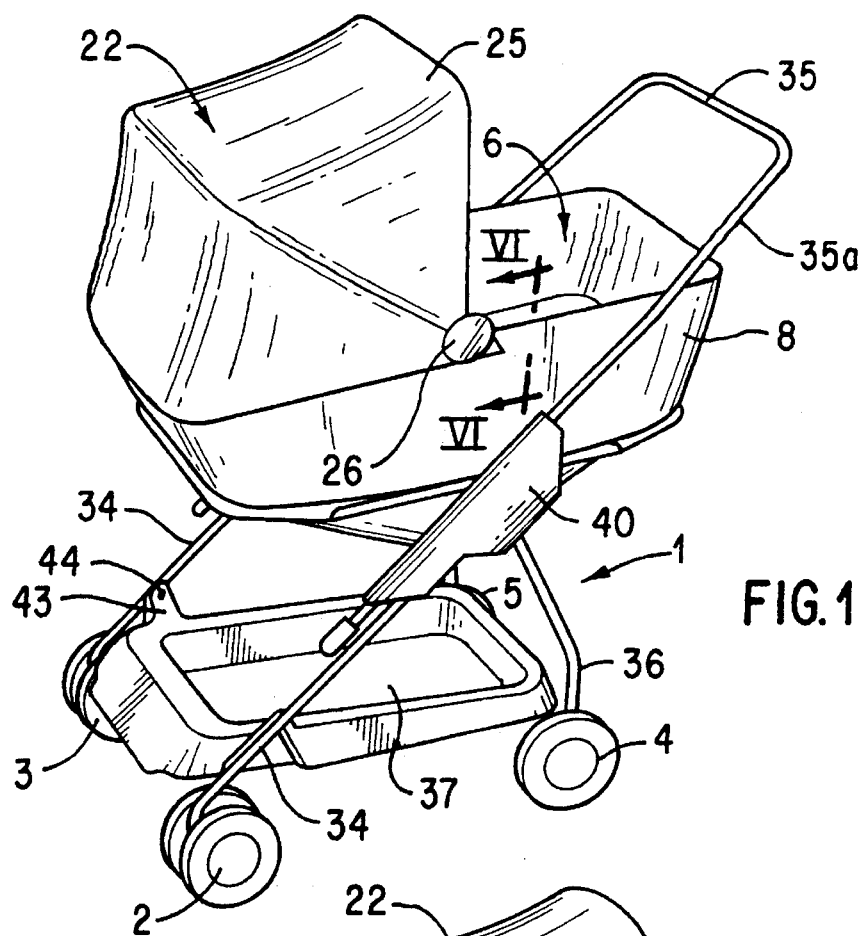
FIG. 1 is a perspective view of a buggy according to the invention, when it is in the assembled and service position.

In general, this buggy comprises:
- an underframe 1 with a rolling device 2 to 5,
- a carriage 6 supported by the underframe 1, the carriage being made up of a reinforcement 7 determining a tray for receiving the child's doll, with a supple covering 8, such as a piece of fabric, matched to the developed surface of the reinforcement
- and a hood 22 made up of a plurality of hoops 23 and 24 articulated about a common rotation pin, a piece of a supple material, for example a piece of fabric, covering over and being fixed to the said hoops. The hood is capable of assuming two positions, namely a deployed position shown in FIGS. 1 and 2, and a folded-up position which is not represented.

Figure 2:
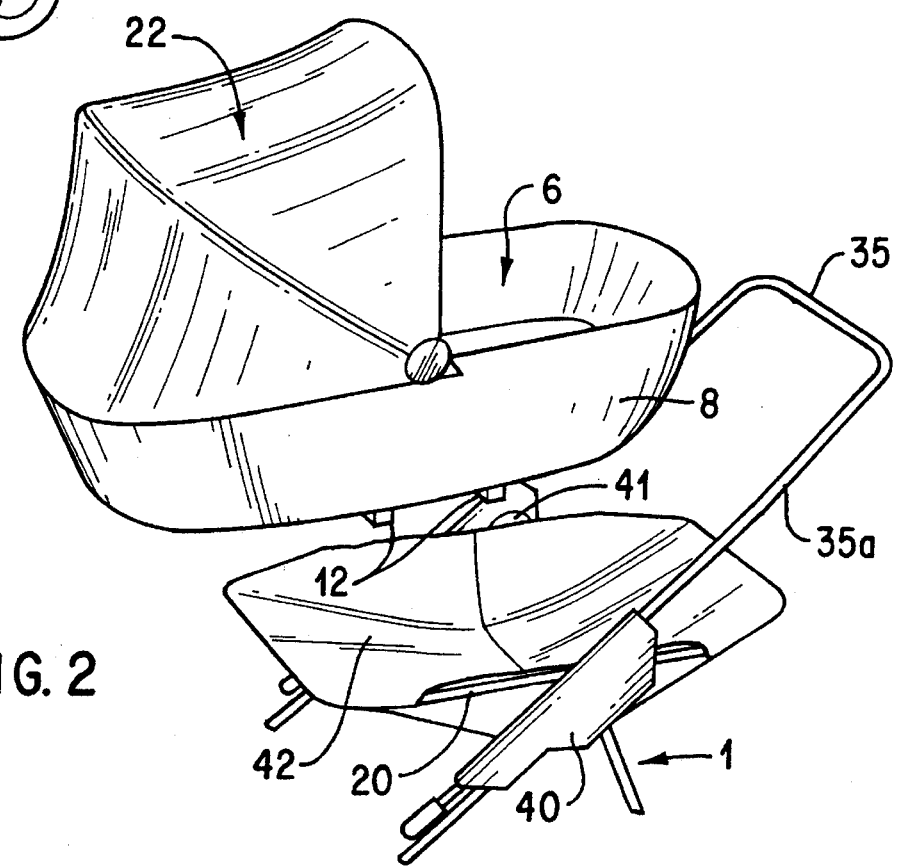
FIG. 2 is a view similar to FIG. 1 when the carriage is detached from the underframe.

As represented more particularly in FIGS. 1 and 5, the underframe 1 comprises two front uprights 34, two rear uprights 36 and a handlebar with a transverse handle 35. Two sets of two wheels, 2 and 3, are fitted on the lower ends of the uprights 34, and each of the upper ends of these uprights 34 is fixed to a joining piece 40 made of a synthetic substance.

The two branches 35a of the handlebar are fixed to the components 40 substantially in the extension of the uprights 34. The rear uprights 36 are articulated at 36a to the same components 40 and are equipped at their lower ends with wheels 4 and 5.

The articulations 36a constitute pivots for internal fixing yokes 41 of a tubular frame 20, of rectangular overall shape carrying a piece of fabric 42. This piece forms a hammock and may act as a seat for the child's doll when the frame 20 is located substantially parallel to the uprights 34.

The underframe carries, at the lower part, a basket 37 which is made of a molded synthetic substance. The basket is secured to front tabs 43 via which it is articulated at 44 to the base and between the front uprights 34. To the rear, the basket includes a hollow rib 45 with at least two notched tabs 46 capable of snap-fastening elastically over a transverse member 38 connecting the lower ends of the uprights 36.

As shown in FIG. 5, at least one of the connection components 40 is equipped with a lever 39 which can occupy a locking position, represented in continuous line, and in which it opposes the rotation of the corresponding upright 36, and an unlocking position, represented in chain line, in which it allows this rotation.

The result of the foregoing description is that the underframe can occupy a folded-up storage or transport position, in which the frame 20, the uprights 34, the handlebar 35, the basket 37, and the arms 36 are folded up against one another and substantially parallel, and an unfolded or service position, as represented in FIG. 5.

As represented in FIG. 3, the reinforcement 7 for the carriage comprises a central framework 9, produced in the form of a single piece with cutouts, particularly made of a synthetic substance, having the overall shape of a trough. This framework is made up of two substantially vertical flanks 10 located on either side of a base 11. The latter includes outer elastic lugs 12 designed to snap-fasten over the rigid tubular frame 20 of the underframe, in order to fix the carriage.

In this embodiment, the base 11 comprises at least two, and in this case three, transverse members 16 which are joined together by two lateral longitudinal members 17, and each flank 10 comprises at least two, and in this case three, uprights 18, joined together by an upper spacer piece 19. A flat bottom 13, for example made of rigid board, rests flat on the base 11 of the framework 9. It has a rectangular overall shape, the middle part 13a of which is designed to be gripped between the two flanks 10 of the framework 9. In order to immobilize the flat bottom 13 on the framework 9, each flank 10 of the framework 9 comprises two lugs 21, each determining, together with the base 11 of the same frame, a gap for trapping the edge of the flat bottom 13, and each including, opposite the said gap, an incline for this same flat bottom 13 to slide down.

A hoop 14, having a rectangular overall shape and made up of a metal strip on edge, is fixed to the upper part of the two flanks 10 of the central framework 9 of the reinforcement 7. At least the central parts of the two longitudinal sides 14a of the hoop 14 are separated by the same amount as the two flanks 10 of the central framework 9 and, more precisely, as two straight grooves 15 formed in the spacer pieces 19 and in which they are inserted.

As shown in FIG. 6, the covering 8 produced from fabric or some other supple substance comprises an external part composed of flanks 8a and of a bottom 8b, and an internal part composed of flanks 8c and of a bottom 8d. The bottom 8b of the external part includes openings 48 for the passage of the elastic lugs 12, whereas the bottom 8d of the internal part includes a central cutout 49 around which is run a casing receiving tensioning elastic. This opening makes it possible to fit the covering over the reinforcement and to take it off in order to wash it and replace it. The transition zone between the external and internal parts of the covering respectively, forms a fold 31 passing over the frame 14 and the upper spacer pieces 19 of the central framework 9. This fold locally includes two openings, which are not represented, for the passage of the tenons 33 for positioning the components 26 by means of which the hood is articulated.

It will be noted that the framework 9 of the reinforcement may be used with a bottom 13, a hoop 14 and a covering 8 which are different in order to form a carriage which is longer or shorter, or which has ends which are rounded to a greater or lesser degree. Another advantage of this construction is that it gives the carriage rigidity in the vertical plane which gives the child a feeling of security.

As shown in FIG. 4, each of the components 26 by means of which the hood 22 is articulated, is composed of two cheeks 28 which are rotationally immobilized with respect to each other by means which are not represented, and which are axially joined by a pivot 27 integral with a trim element 27a. These two cheeks delimit a pivot gap 30 communicating to the outside via a circular-arc-shaped slit 29, the edges of which are nicked at 29a (FIG. 3). The end 23a of the hoop 23 of the hood is articulated on the pivot 27 in the gap 30 whereas the end 24a of the hoop 24 is articulated on the same pivot 27, but outside of the cheeks and on their side pointing toward the inside of the buggy.

The inner cheek 28 of each articulation component 26 is secured to a vertical and dorsal mortise 32 (visible in FIG. 3) capable of engaging over one of the tenons 33 projecting vertically from the flanks 10 of the central framework 9.

Finally, the two cheeks 28 form, between them and below the pivot 27, two spaced-apart snap-fastening jaws 50 each including, facing one another, a nick 52. When each component 26 is fitted over the upper spacer piece 19 of the reinforcement, the two jaws of the cheeks 28 separate elastically, straddling the corresponding spacer piece 19 of the reinforcement, until their nicks 52 bear under the spacer piece, as shown in FIG. 4. In this configuration, the cheeks not only provide the vertical translational connection of the articulation component 26 with the carriage 6, but also pinch the fold 31 of the covering 8 against the faces of the spacer piece 19. This pinching takes place on both sides of the carriage and alone immobilizes the covering 8 with respect to the reinforcement 7, both longitudinally and vertically. In this way, the components 26 participate in producing the carriage while preventing any movements of its covering.

I claim:

1. A vehicle comprising:

an underframe having a rolling device, and a carriage, supported by the underframe, comprising at least one reinforcement, wherein the at least one reinforcement comprises:

a base that is configured to fix the at least one reinforcement to the underframe, a central framework having a generally trough-like shape comprising two flanks, each said flank projecting from the base, a bottom portion that rests on the base and has a central part that is configured to be gripped between the two flanks of the central framework, and a hoop fixed to upper parts of the two flanks, said hoop having a shape matching a contour of the bottom portion and comprising longitudinal sides having at least two central parts that are separated from one another by a distance that is approximately a distance between the two flanks of the central framework.

2. The vehicle according to claim 1, wherein the base of the central framework comprises at least two transverse members joined together by two longitudinal members.

3. The vehicle according to claim 1, wherein each flank of the central framework comprises at least two uprights joined together by an upper spacer piece.

4. The vehicle according to claim 1, wherein the central framework is produced in the form of a single piece having cutouts.

5. The vehicle according to claim 1, wherein the base of the central framework is fixed to the underframe using elastic lugs situated on and extending from the base, and each elastic lug in designed to be snap-fastened over a rigid part of the underframe.

6. The vehicle according to claim 1, wherein each flank of the central framework comprises at least one lug for defining, together with the base of the central framework, a gap for trapping the edge of the bottom portion.

7. The vehicle according to claim 1, wherein the hoop comprises a metal strip-on edge, and the two central parts of the hoop are fixed to the upper parts of the two flanks using two grooves formed in upper spacer pieces of the two flanks.

8. The vehicle according to claims 1, wherein each of two components, which allow hood hoops of a hood to be articulated, comprises two cheeks which, below a pivot that joins the cheeks together and acts to pivot the hood hoops, form two spaced-apart jaws capable of straddling and elastically clamping an upper spacer piece of the at least one reinforcement while pinching a fold of a covering of the carriage.

9. The vehicle according to claim 8, wherein each of the cheeks of each said component includes a nick for snap-fastening the at least one reinforcement to the spacer piece.

10. The vehicle according to claim 8, wherein each said component is secured to a vertical mortise capable of engaging positioning tenons projecting vertically upward from each of the two flanks of the central framework.

11. A vehicle according to claim 1, further comprising a supple covering matched to a developed surface of the at least one reinforcement, wherein the supple covering covers and is fixed to the at least one reinforcement.

12. The vehicle according to claim 11, wherein the supple covering comprises a piece of fabric.

13. The vehicle according to claim 4, wherein the single piece comprises a synthetic substance.

14. The vehicle according to claim 6, wherein said at least one lug includes, opposite the gap, an incline for the flat bottom to slide upon.

15. The vehicle according to claim 1, wherein the at least one reinforcement comprises a tray that is configured to receive at least one of an object and an individual.

* * * * *